Sept. 21, 1965
S. G. ENDERS
3,206,989
ARCUATE MOTION JIG SAW
Filed May 21, 1963
3 Sheets-Sheet 1
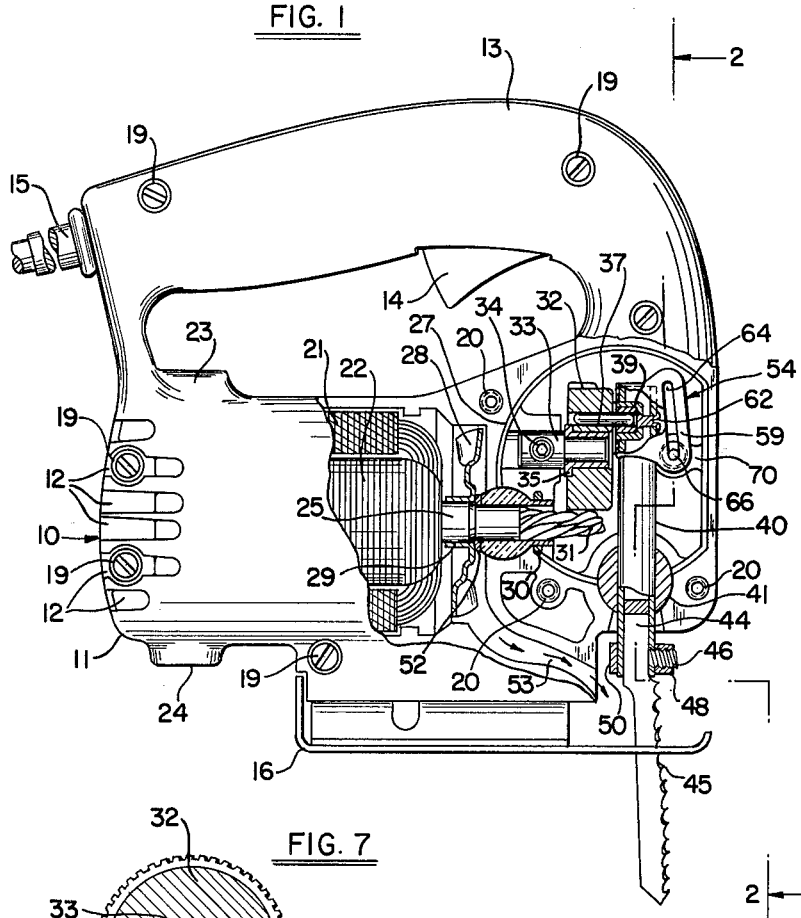
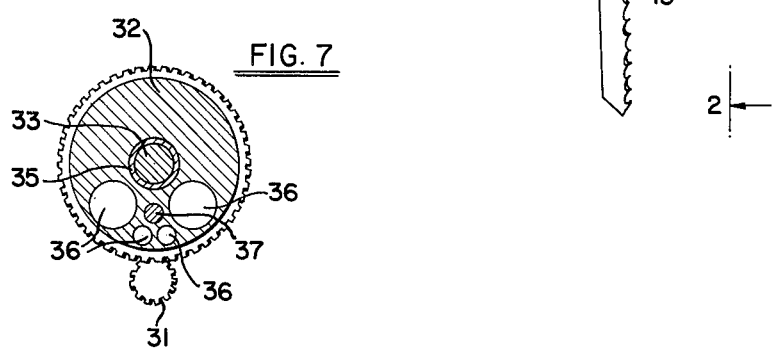

Sept. 21, 1965     S. G. ENDERS     3,206,989
ARCUATE MOTION JIG SAW
Filed May 21, 1963     3 Sheets-Sheet 2
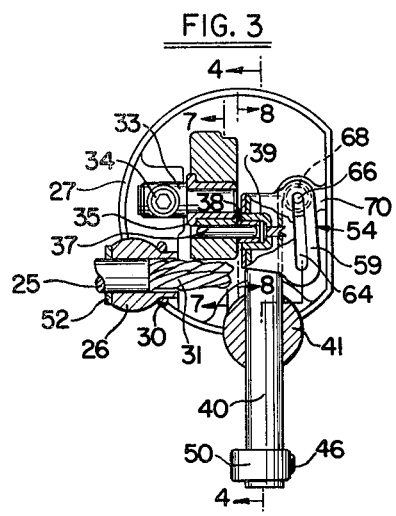

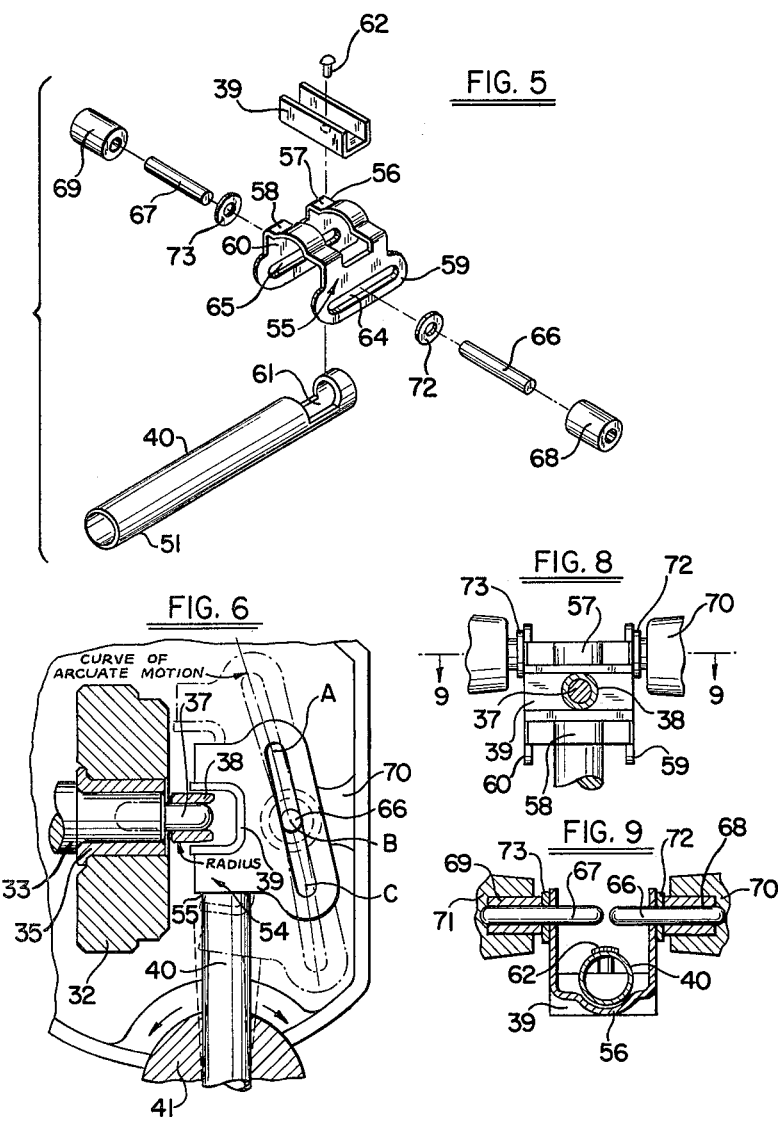

United States Patent Office 3,206,989
Patented Sept. 21, 1965

3,206,989
ARCUATE MOTION JIG SAW
Sherwood G. Enders, Bowley's Quarters, Md., assignor to
The Black and Decker Manufacturing Company, Towson, Md., a corporation of Maryland
Filed May 21, 1963, Ser. No. 282,089
4 Claims. (Cl. 74—50)

The present invention relates to power-driven reciprocating tools, and more particularly, to a power-driven jig saw having its blade reciprocating in the same slightly arcuate path on its forward stroke as on its return stroke.

In the prior art relating to power-driven jig saws, numerous attempts have been made to "back off" the saw teeth from the work during the non-cutting stroke of the blade, thus eliminating "saw drag" and providing for more rapid and efficient sawing operations. More specifically, it has been the well-established practice to provide, in conjunction with an oscillating or pivoted guide, or guides, a positive or actuated auxiliary linkage that is synchronized with the downward thrust of the blade holder so as to superimpose a horizontal force upon the blade holder at or near the lower portion thereof, thus tending to reciprocate the blade holder in a lateral direction to-and-fro; the summation of vertical and horizontal movements of the blade holder thus achieving the overall effect of an orbital or elliptical type of motion of the blade and blade holder. However, not only does such an actuated auxiliary linkage necessitate a more complicated and bulky design that is costly and more difficult to assemble; but moreover, experience has indicated that the use of an orbital or elliptical type of motion as contradistinguished from an ordinary reciprocation of the blade, while admittedly more efficient on straight-line cutting, is nevertheless much more difficult to control when performing intricate scroll cuts.

Therefore, it is a basic object of the present invention to provide a power-driven tool, such as a jig saw, having non-actuated guide means to constrain the tubular shaft to reciprocate in the same slightly arcuate path on its forward stroke as on its return stroke, thus simulating the graceful, natural curve of the most efficient manner of hand sawing.

It is another object of the present invention to provide a power driven jig saw whose arcuate blade motion achieves much faster cutting than ordinary straight reciprocation of the blade, especially on thicker lumber, thus giving the operator the feeling of "free cutting" without the necessity for continually exerting a great deal of pressure in pushing the saw into the work.

It is yet another object of the present invention to provide a simplified jig saw featuring a split casing, a single rotating counterbalanced gear, and a motion-translating mechanism, and which is capable of being mass produced in a rapid and economical manner.

It is still another object of the present invention to provide a jig saw mechanism wherein the arcuate path of movement of the tubular shaft lies in a plane which contains the axis of the single counterbalanced gear.

It is a further object of the present invention to provide, in conjunction with the non-actuated guide means, a pivoted bearing for journalling the tubular shaft and adapted to pivot slightly about an axis which is transverse to the longitudinal axis of the tubular shaft.

It is a still further object to provide a convenient and economical embodiment of the non-actuated guide means inherent in the present invention.

It is a still further object of the present invention to provide a jig saw mechanism having convenient means for preventing a turning or twisting of the blade or blade holder, thus obviating the necessity for using expensive components, such as square tubular shafts journalled in square bearings.

It is a yet further object of the present invention to provide in a jig saw mechanism, means for eliminating additional grease seals, which are ordinarily provided for the reciprocating shaft in an orbital-motion jig saw, and which are otherwise costly and consume time in the tool assembly.

In accordance with the teachings of the present invention, a power-driven jig saw is provided having an armature pinion meshing with a single counterbalanced gear, a motion-translating mechanism preferably of the Scotch-yoke type, and a tubular shaft adapted to reciprocate in a generally linear path, the shaft being journalled within the tool by means of a pivoted bearing. This pivoted bearing is housed between respective bosses formed in the lower positions of the mating halves of the split casing and is adapted to pivot slightly about an axis which is transverse to the longitudinal axis of the reciprocating shaft. Non-actuated guide means are then provided to constrain the tubular shaft to reciprocate in the same slightly arcuate path on its forward stroke as on its return stroke, such non-actuated guide means herein disclosed taking the convenient form of a saddle assembly comprising a base portion secured to the tubular shaft near the top thereof and a pair of parallel wings projecting from opposite sides of the base portion on the side of the shaft opposite from the gear. Parallel longitudinal guide slots are provided in each of the wings, the guide slots being angularly offset by a slight amount with respect to the longitudinal axis of the shaft. A pair of corresponding pins are each mounted for non-reciprocation within the tool casing and are each adapted to pass through the respective guide slots with sufficient clearance therebetween. As the tubular shaft reciprocates during the operation of the tool, the wings will bear upon and slide with respect to the pins; and the angularly offset guide slots in the wings will constrain the shaft to reciprocate in the same slightly arcuate path on its forward stroke as on its return stroke, with the pivoted bearing alternately pivoting through a slight angle along an axis transverse to the longitudinal axis of the shaft. Also, special roller means are provided within the motion-translating mechanism so as to avoid any undue shearing stresses from otherwise being developed as a result of the slight arcuate motion of the reciprocating tubular shaft.

Other objects of the present invention will become apparent from an inspection of the following specification taken in conjunction with the enclosed drawings, in which:

FIGURE 1 is an elevational view of a complete assembly for a jig saw incorporating the teachings of the present invention, with part of the tool housing cut-away to show the operating mechanism partially in full and partially in longitudinal section;

FIGURE 2 is a view taken along the lines 2–2' of FIGURE 1 and showing the pivoted bearing in full view;

FIGURE 3 is an elevational view of the gear case partially in full and partially in longitudinal section, corresponding to that as shown in FIGURE 1, but showing the operating mechanism in its extreme downward position;

FIGURE 4 is a view taken along the lines 4–4' of FIGURE 3 and showing the pivoted bearing in full view;

FIGURE 5 is a slightly enlarged exploded view of one embodiment of the non-actuated guide means inherent in the present invention;

FIGURE 6 is an enlarged view of the non-actuated guide means, with the angular offset of the guide slots in the wings of the saddle being exaggerated, in order to illustrate the development of the slight arcuate motion of the tubular shaft;

FIGURE 7 is a slightly enlarged view taken along the lines 7–7' of FIGURE 3, showing the meshing pinion and single gear having holes drilled therein for counterbalancing purposes;

FIGURE 8 is a slightly enlarged view taken along the lines 8–8' of FIGURE 3, showing, among other elements, the eccentric pin and roller positioned within the yoke; and FIGURE 9 is a slightly enlarged view taken along the lines 9–9' of FIGURE 8, showing the saddle and yoke in sectional end view.

With particular reference to FIGURES 1 and 2, there is illustrated a power-driven jig saw 10 having a main tool housing 11 provided with air ventilating slots 12, and also having an overhead handle 13, switch 14, electric line cord 15, and shoe 16. The main tool housing 11 is integral with the overhead handle 13, and together they are of the split casing type, being comprised of a pair of suitable die-cast aluminum mating halves 17 and 18 as shown more clearly in FIGURE 2. All of the components of the overall operating mechanism may thus be easily positioned within one of the mating halves of the split casing, say 18, and assembled together; and then the entire tool may be conveniently assembled by placing the corresponding mating half of the split casing, say 17, over the other mating half 18 and securing it by means of a plurality of screws 19 that engage a plurality of corresponding threaded recesses 20 formed in the mating half 18 of the split casing. Such a split casing construction (that either has both the main tool housing 11 and the integral overhead handle 13 formed of two mating halves 17 and 18, or else has merely the forward portion of the tool comprised of two mating halves) when considered in conjunction with certain novel elements of the operating mechanism hereinafter to be described in detail, facilitates rapid and precise assembly of the overall tool and thus provides a rugged and reliable structure capable of being mass-produced easily and economically.

Again, with particular reference to FIGURE 1, the main tool housing 11 is provided with an electric motor 21 having an armature 22 journalled in suitable bearings. The electrical connections from the electric line cord 15 and switch 14 to the motor 21, being conventional, form no part of the present invention and are omitted herein for ease of illustration and clarity of understanding. Likewise, the main tool housing 11 is further provided with portions 23 and 24 for housing the conventional brushes, which may, if desired, be skewed or offset slightly with respect to the armature axis so that adequate room is provided for removing the top brush without interfering with the overhead handle 13 and without necessitating that the mating halves 17 and 18 be disassembled, thus providing for rapid replacement of the brushes and easier servicing of the tool without any increase in the lateral width of the tool. Also, the shoe 16 may be of a more sophisticated design, for example it may be pivoted for making bevel cuts; but inasmuch as the shoe 16 forms no part of the present invention, it is shown in simplified form in FIGURES 1 and 2.

As shown in FIGURES 1 and 3, the armature 22 is provided with an armature shaft 25 journalled in a suitable sleeve bearing 26 positioned in a boss formed within a gear case 27 of the main tool housing 11. A fan 28 has its hub 29 pressed onto the armature shaft 25, and a fibre washer 52 is located between hub 29 and sleeve bearing 26. Sleeve bearing 26 is further provided with an O-ring 30, which serves as a grease seal. The forward extremity of armature shaft 25 is fashioned into a pinion 31, which, as shown in FIGURES 1 and 3, is preferably (but not necessarily) of a helical design for reasons to be given hereinafter. Pinion 31 meshes with a single gear 32, which is suitably journalled upon a stub shaft 33. Stub shaft 33 is held within a boss in gear case 27 by means of a socket-head machine screw 34, which engages a tapped hole (not shown) within the casing. Gear 32 is journalled upon stub shaft 33 by means of a sleeve bearing 35, which is loosely fitted over stub shaft 33, but press-fitted into the hub of gear 32. Gear 32, meshing with pinion 31, is likewise of a helical design; and the pitch and rotation of gear 32 is such that gear 32 exerts a force or end-thrust rearwardly against the shoulder of stub shaft 33 through the sleeve bearing 35, thus obviating the necessity for mechanically holding gear 32 axially along stub shaft 33. Also, as shown in FIGURE 7, the motion-translating mechanism is suitably counterbalanced by means of a plurality of holes 36 drilled into gear 32, such a counterbalancing method being both economical and easy to produce.

As shown in FIGURES 1 and 3, and in additional detail in FIGURES 7 and 8, an eccentric pin 37 is press-fitted into a recess in gear 32; and a roller 38 is loosely fitted over the protruding end of pin 37. Roller 38 is guided within the confines of a cross yoke 39 secured to a tubular shaft 40, which is usually guided for ordinary reciprocation within the tool casing, the overall construction of the motion-translating mechanism of the rotating gear 32, eccentric pin 37, roller 38, yoke 39, and shaft 40 being of the conventional Scotch-yoke type that is well-known in the art; but it should be noted that the present invention is adaptable to other types and configurations of motion-translating mechanisms, and that the essence of the present invention is not necessarily to be limited thereby.

As shown in FIGURES 1–4, shaft 40 is journalled within the main tool housing 11 by means of a pivoted bearing 41, which comprises a cylindrical block having a transverse bore for guiding shaft 40. Pivoted bearing 41 is loosely housed within the confines of a pair of corresponding bosses 42 formed within the mating halves 17 and 18 of the split casing design; and the pivoted bearing 41 is axially pe-loaded within the bosses 42 by means of a pair of corresponding leaf springs 43, as shown more particularly in FIGURES 2 and 4. Pivoted bearing 41 is thus adapted to pivot slightly about its axis, which is transverse to the axis of shaft 40. Both pivoted bearing 41 and sleeve bearings 26 and 35 are sintered bearings produced from a suitable composition of materials, such as iron and bronze, but it is to be understood that other types of bearing materials, and other configurations of pivoted bearing assemblies equivalent in function to that of the particular pivoted bearing 41 shown in the drawings, are equally applicable to the teachings of the present invention.

The lower extremity of shaft 40 is provided with a press-fitted slotted insert 44, (preferably of aluminum) shown more particularly in FIGURES 1 and 2. Insert 44 is adapted to receive a suitable blade 45, which is clamped in position my means of a pair of set screws 46 and 47. Set screws 46 and 47 are in turn received within a pair of corresponding tapped holes 48 and 49 formed at right angles to each other within a locking collar 50; and further holes are formed at right angles to each other within the lower extremity of shaft 40 (as at 51 in FIGURE 5), whereby blade 45 may be suitably clamped in a manner well-known in the art. Likewise, as shown in FIGURE 1, an air passage 53 is provided within the main tool housing 11, whereby a portion of the ventilating air that is drawn over motor 21 by means of fan 28, is discharged as indicated by the arrows via air passage 53 to the working area of blade 45 to blow away the chips and dust particles.

The primary objects of the present invention are accomplished by means of a non-actuated guide means 54, which is "non-actuated" in the sense that it does not derive a secondary or auxiliary positive motion from the rotation of the armature shaft 25 or gear 32 or other rotating means and then seek to superimpose a type of lateral motion upon the ordinary reciprocation of tubular shaft 40 (which is a method that is well-illustrated in the art); but rather, the non-actuated guide means 54 merely constrains shaft 40 to reciprocate in the same slightly arcuate path on its forward stroke as on its return stroke, with the pivoted bearing 41 pivoting slightly along a transverse axis to accommodate the resulting slightly arcuate motion of shaft 40, and with additional means being provided to prevent any undue shearing stresses from otherwise being developed across the motion-translating mechanism, in general, and the eccentric pin 37, in particular. With this in mind, the non-actuated guide means 54 may be visualized as having a variety of constructions, all of which would serve substantially an equivalent function; namely, to constrain the tubular shaft 40 to reciprocate in the same slightly arcuate path on its forward stroke as on its return stroke by means which may include, preferably, a guide slot or track or a pair of guide slots which are angularly offset by a slight amount with respect to the longitudinal axis of the tubular shaft 40; and it should be understood that the particular configuration of the non-actuated guide means 54 hereinafter to be described in detail has been chosen to illustrate the teachings and essence of the present invention, and that the scope of the invention is not necessarily to be limited thereby. Also, not only is the function accomplished by the non-actuated guide means 54 believed to be unique to the art, but moreover, the construction of the particular non-actuated guide means 54, in and of itself, incorporates certain novel features and arrangement of parts hereinafter to be described in detail.

More specifically, as illustrated in the drawings, particularly the exploded view of FIGURE 5, non-actuated guide means 54 includes a unique saddle 55, which is comprised of a base portion 56 having a pair of parallel strips 57 and 58, and a pair of parallel wings 59 and 60 projecting from opposite sides of the base portion 56 on the side of shaft 40 which is opposite and away from the yoke 39. The shaft 40, yoke 39, and saddle 55 are assembled together as an integral unit in the following manner: The saddle is first positioned over shaft 40 in such a manner whereby the cut-out part of the base portion 56 of saddle 55 will coincide with the corresponding cut-out part 61 of shaft 40, the parallel strips 57 and 58 each having a suitable hump (see FIGURES 5 and 9) to fit around the tubular shaft 40. The yoke 39 is next fitted into the cut-out part of the base portion 56 of saddle 55 and depressed downwardly to fit within the confines of cut-out 61 formed in shaft 40. A rivet 62, or other suitable means, is then used to secure yoke 39 to shaft 40; and in such a manner; saddle 55 is held onto shaft 40, there actually being a slight clearance in the final assembly between saddle 55 and shaft 40, as shown more clearly in FIGURE 9. The rivet 62 is used to hold the yoke 39, shaft 40, and saddle 55 together so that the entire sub-assembly preferably may be dip-brazed, as indicated at 63 in FIGURES 2 and 4, and simultaneously cyanide-hardened.

As shown more clearly in FIGURES 1, 3, and 5, the wings 59 and 60 are provided with parallel guide slots 64 and 65, respectively, which are angularly offset by a slight degree with respect to the longitudinal axis of shaft 40. More particularly, the angle of offset is preferably in the order of 3°, although it is to be realized that other values are within the realm of the present invention. The guide slots 64 and 65 form a track or guide-way for a pair of correspondingly pins 66 and 67, respectively, which are stationary with respect to the main tool casing 11 in the sense that they are non-reciprocating. Each of the pins 66 and 67 are received within a pair of corresponding sleeve bearings 68 and 69 respectively (preferably sintered) which are in turn received within corresponding bosses 70 and 71, respectively, formed within the gear case portion 27 of the main tool housing 11. Finally, suitable washers 72 and 73, respectively, are interposed between the sleeve bearings 68 and 69 and the wings 59 and 60, respectively. All of the aforementioned components, namely the eccentric pin 37, roller 38, yoke 39, tubular shaft 40, saddle 55, and pins 66 and 67, are of high-quality heat-treated steel to insure longer tool life and much greater reliability in service.

As the tubular shaft 40 reciprocates, it will be constrained to move in a slightly arcuate path by virtue of the non-actuated guide means 54, in general, and the angularly offset guide slots 64 and 65, in particular, which cooperate with the stationary pins 66 and 67, respectively, the slightly arcuate motion of reciprocating shaft 40 being accommodated by means of the pivoted bearing 41, which pivots slightly about an axis transverse to the longitudinal axis of shaft 40.

With particular reference to FIGURE 6, the development of the slightly arcuate motion may be visualized from the enlarged schematic view, it being understood that the angular offset of guide slots 64 and 65 has been exaggerated in FIGURE 6 for reasons of ease of illustration and clarity of understanding. FIGURE 6 shows the saddle 55, and naturally the integral yoke 39 and shaft 40, in three positions, namely, the extreme top, middle, and extreme lower positions corresponding, of course, to a total displacement of the eccentric pin 37 of 180°. If any three corresponding points are selected, say the mid-points of either guide slot 64 or 65, such as has been denoted by the letters A, B, and C in FIGURE 6, it will be seen upon close examination that the points A, B, and C do not lie in a straight line, but rather, must be connected by a slight curve, which then comprises (or is parallel to) the curve of the slightly arcuate motion exhibited by the shaft 40. Furthermore, the blade 45, being secured to shaft 40, will likewise assume a slightly arcuate movement in unison with shaft 40. Moreover, inasmuch as the shaft 40 (or blade 45) is being constrained to move in a slightly arcuate path by virtue of the non-actuated guide means 54, as contradistinguished from superimposing an additional lateral movement upon the end of shaft 40 to otherwise result in the well-known orbital or elliptical movement of the shaft, it follows that the same degree or type of constraint will be imposed upon the shaft 40 by the non-actuated guide means 54, regardless of whether the shaft 40 is moving up or down, that is to say, the curve of arcuate motion is identical on the upstroke as on the downstroke, and vice-versa; and therefore, it further follows that the shaft 40 (and consequently the blade 45) will move in the same slightly arcuate path on its forward (or downstroke) as on its return (or upstroke). As previously indicated, the slightly arcuate motion of shaft 40 within the main tool housing 11 is accommodated by means of the pivoted bearing 41, which pivots slightly along an axis transverse to the longitudinal axis of shaft 40, as is indicated by means of the arrows in FIGURE 6.

Futhermore, it will also be understood that in the operation of the tool, as the blade 45 is moving in a slightly arcuate path, at the same time it is being fed forwardly into the work, so that ultimately the blade 45 (and in particular, a given point on blade 45) describes a series or a continuation of slight curves as the tool is fed through the work; and the net result is that the blade 45 in effect "backs-away" from the work on its downstroke and then is advanced into the work on its upstroke, which in a tool of the jig saw type, constitutes the cutting or working stroke. Although, admittedly, the curve of arcuate motion developed by blade 45 is indeed very slight, nevertheless, experience has taught that with roughly 3° angular offset of guide slots 64 and 65, that much faster straight-line cutting can be achieved over ordinary vertical reciprocation of the shaft 40, especially in the thicker lumber sizes, say of 2" thickness, a performance which is at least comparable, if not superior, to that of an orbital or elliptical blade movement; moreover, the mechanism performs intricate scroll cuts that cannot otherwise be as easily achieved by means of an orbital or elliptical blade movement. Moreover, the non-actuated guide means provides a subsidiary advantage in that it effects much greater lateral stability of shaft 40, which guarantees against a twisting or turning of the blade 45 in the operation of the tool. Furthermore, the fact that pivoted bearing 41 has a cylindrical configuration and is housed within the confines of corresponding bosses 42, and the further fact that pivoted bearing 41 pivots about its own axis transverse to the axis of shaft 40 (rather than moves laterally under the impetus of a superimposed endwise or lateral force, as is the cas with respect to the series of orbital or ellipitical-motion jig saws) preclude the necessity for providing additional grease seals both at the top and bottom of the lower bearing for the reciprocating shaft; and therefore, the elimination of any additional grease seals (which are otherwise needed in an orbital-motion jig saw) is another subsidiary advantage of the present invention.

Therefore, it is seen that the mechanism herein disclosed features a combination of advantages (on both rapid straight-line cutting and on intricate and delicate scroll cuts) in a tool that is well-constructed, reliable, less-costly, and capable of being rapidly assembled in mass production.

Experience has also taught that the slightly arcuate motion of shaft 40 ordinarily develops fairly appreciable shearing stresses on the eccentric pin 37, which would accelerate the wear on pin 37; but such stresses can be neutralized very easily by a number of means, as for example, by providing a suitable radius on roller 38 (as shown in FIGURE 6). The same purpose could, of course, be accomplished by means of a straight roller having a large degree of clearance between itself and yoke 39, but such undue clearance would create undesirable "slop" in the motion-translating mechanism and generate a pounding or undesirable noise. The radius which is provided on roller 38 allows a much lower degree of clearance to be used between roller 38 and yoke 39, which is consonant with good design practices.

Thus, it is seen that the objects of the present invention are accomplished in a superior mechanism which is rugged, reliable, and economical to produce. Obviously, numerous modifications may be made without departing from the basic spirit of the present invention; and therefore, it is to be understood that within the scope of the appended claims, the invention may be practiced other than has been specifically described.

I claim:
1. In an arcuate motion jig saw having a reciprocating shaft journaled in a pivoted bearing in the housing, wherein the shaft is constrained to reciprocate in an arcuate path which is concave when viewed in the direction of the cut being made in the work, that improvement in constraining guide means between the shaft and the housing, which comprises:
   (A) a first member secured to the reciprocating shaft;
   (B) said first member having a guide track formed therein, said track being angularly skewed with respect to the longitudinal axis of the shaft and converging with the shaft axis in a direction away from the pivoted bearing; and
   (C) a second member retained in the housing and riding in said guide track of said first member.

2. In an arcuate motion jig saw having a reciprocating shaft journaled in a pivoted bearing in the housing, wherein the shaft is constrained to reciprocate in an arcuate path which is concave when viewed in the direction of the cut being made in the work, that improvement in constraining guide means between the shaft and the housing, which comprises:
   (A) a saddle secured to the reciprocating shaft and having a pair of parallel wings projecting therefrom, one on each side of the shaft;
   (B) each of said wings having a guide slot formed therein, said guide slots being angularly skewed with respect to the longitudinal axis of the shaft and converging with the shaft axis in a direction away from the pivoted bearing; and
   (C) a pair of mutually-aligned pins mounted in the housing, each of said pins passing through a respective one of said guideslots.

3. In a portable electric jig saw having a shaft journaled for reciprocation in the housing and further having a motion-translating means comprising a channel-shaped transverse yoke secured to the shaft and an eccentrc member guide in the yoke, that improvement in constraining guide means for the shaft assembly, which comprises:
   (A) a saddle secured to the shaft adjacent the yoke;
   (B) said saddle having a base comprising a transverse cut-out portion to receive the yoke and a pair of parallel strips, one on each side of said cut-out portion, to support the sides of the yokes;
   (C) said saddle further having a pair of parallel wings, one on each side of said base, and projecting therefrom in a direction away from the yoke and the eccentric member;
   (D) said wings each having a guide slot formed therein; and
   (E) a pair of mutually-aligned pins mounted in the housing, each of said pins passing through a respective one of said guide slots.

4. In an arcuate motion jig saw having a reciprocating shaft journaled in a pivoted bearing in the housing and further having a motion-translating mechanism comprising a channel-shaped transverse yoke secured to the shaft and an eccentric member guide in the yoke, and wherein the shaft is constrained to reciprocate in an arcuate path which is concave when viewed in the direction of the cut being made in the work, that improvement in constraining guide means between the shaft and the housing, which comprises:
   (A) a saddle secured to the shaft adjacent the yoke;
   (B) said saddle having a base comprising a transverse cut-out portion to receive the yoke and a pair of parallel strips, one on each side of said cut-out portion, to support the sides of the yokes;
   (C) said saddle further having a pair of parallel wings, one on each side of said base, and projecting therefrom in a direction away from the yoke and the eccentric member;
   (D) each of said wings having a guide slot formed therein, said guide slots being angularly skewed with respect to the longitudinal axis of the shaft and converging with the shaft axis in a direction away from the pivoted bearing;
   (E) a pair of mutually-aligned pins, stationary with respect to the reciprocating shaft, each of said pins passing through a respective one of said guide slots; and
   (F) respective sleeve bearings to journal said pins in the housing.

References Cited by the Examiner

UNITED STATES PATENTS

| 49,791 | 9/65 | Robinson | 143—68 |
| 470,233 | 3/92 | Caldwell | 143—68 |
| 3,095,748 | 7/63 | Stelljis | 143—68 X |

BROUGHTON, G. DURHAM, *Primary Examiner.*